United States Patent
Zakai et al.

(10) Patent No.: US 6,480,930 B1
(45) Date of Patent: Nov. 12, 2002

(54) MAILBOX FOR CONTROLLING STORAGE SUBSYSTEM RECONFIGURATIONS

(75) Inventors: Avinoam Zakai, Haifa (IL); David Wayne DesRoches, Methuen, MA (US); Victoria Dubrovsky, Westboro, MA (US); Shai Bar-Nefy, Ramat Hamasharon (IL); Ruben Michel, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/396,146

(22) Filed: Sep. 15, 1999

(51) Int. Cl.[7] .............................................. G06F 12/02
(52) U.S. Cl. ...................... 711/105; 711/159; 711/170; 709/105
(58) Field of Search ...................... 74/170, 4, 5, 111, 74/112, 114; 709/105; 711/159, 165

(56) References Cited

U.S. PATENT DOCUMENTS

| | | | | |
|---|---|---|---|---|
| 4,638,424 A | * | 1/1987 | Beglin et al. ............... | 711/112 |
| 5,950,218 A | * | 9/1999 | Howard ......................... | 711/4 |
| 6,061,761 A | * | 5/2000 | Bachmat ....................... | 711/114 |
| 6,088,766 A | | 7/2000 | Bachmat et al. ............. | 711/114 |
| 6,189,071 B1 | | 2/2001 | Bachmat ....................... | 711/114 |
| 6,209,059 B1 | * | 3/2001 | Ofer et al. ................... | 711/114 |
| 6,237,063 B1 | | 5/2001 | Bachmat ....................... | 711/114 |

* cited by examiner

Primary Examiner—Matthew Kim
Assistant Examiner—B. R. Peugh
(74) Attorney, Agent, or Firm—Gary A. Walpert; John M. Gunther; Penelope S. Wilson

(57) ABSTRACT

A method balances workloads of storage devices of a storage subsystem. The method includes reading a mailbox to obtain control parameters and collecting historical data on numbers of accesses to storage volumes of the storage devices. The control parameters are written in the mailbox by host devices. The method also includes selecting data swaps that lead to better balanced workloads for storage devices based on the historical data. The act of selecting and/or the act of collecting being initialized by the control parameters.

11 Claims, 10 Drawing Sheets

| TABLE OF HISTORICAL DATA ON WORKLOADS | | | | | | | | |
|---|---|---|---|---|---|---|---|---|
| VOL. ID | A | B | C | D | E | F | ... | EXCLUDE |
| 1 | 10 | 7 | 7 | 9 | 0 | 7 | ... | N |
| 2 | 9 | 6 | 3 | 5 | 0 | 6 | ... | N |
| 3 | 4 | 9 | 11 | 5 | 0 | 4 | ... | N |
| | 11 | 2 | 12 | 7 | 6 | 5 | ... | Y |
| ⋮ | | | | | | | | ⋮ |
| N | 9 | 3 | 13 | 6 | 5 | 8 | | Y |

TABLE OF HISTORICAL DATA ON WORKLOADS — 46

| VOL. ID | A | B | C | D | E | F | ... | EXCLUDE |
|---|---|---|---|---|---|---|---|---|
| 1 | 10 | 7 | 7 | 9 | 0 | 7 | ... | N |
| 2 | 9 | 6 | 3 | 5 | 0 | 6 | ... | N |
| 3 | 4 | 9 | 11 | 5 | 0 | 4 | ... | N |
|   | 11 | 2 | 12 | 7 | 6 | 5 | ... | Y |
| ⋮ | | | | | | | | ⋮ |
| N | 9 | 3 | 13 | 6 | 5 | 8 |  | Y |

SWAP PRIORITIES

VOL. 50

| A | B | C | D | E | F | ... |
|---|---|---|---|---|---|---|
| PREFER | PREFER | PREFER | ENABLE | ENABLE | PREFER | ... |

FIG. 4B

MAILBOX FOR CONTROLLING STORAGE SUBSYSTEM RECONFIGURATIONS

BACKGROUND OF THE INVENTION

The invention relates to data storage of a distributed storage subsystem.

Enterprises often have storage subsystems that use large arrays of physical storage devices to provide shared data storage for host devices. Typically, the host devices are isolated so that they are unaware of the complete physical layout of data storage of the storage subsystem. Instead, the host devices know the logical layout of data storage.

By isolating host devices from the physical layout of the storage subsystem, host applications become more portable. The host applications can execute on host devices using storage subsystems having different physical layouts. But, such host devices are also unaware of the workloads of the individual physical storage devices.

Since the host devices do not know the workloads of physical storage devices, they cannot change their storage usage patterns to compensate for overloading particular physical storage devices. Overloading a physical storage device can cause the device's physical drives to operate slowly. Slow physical drives lead to long access times and degraded performance of the host applications that use the storage device.

SUMMARY OF THE INVENTION

In a first aspect, the invention provides a method of balancing workloads of storage devices of a storage subsystem. The method includes reading a mailbox to obtain control parameters and collecting historical data on numbers of accesses to storage volumes of the storage devices. The control parameters are written in the mailbox by host devices. The method also includes selecting data swaps that lead to better-balanced workloads of storage devices based on the historical data. Either the act of selecting or the act of collecting depends on the control parameters.

In a second aspect, the invention provides a storage subsystem that provides data storage to a plurality of host devices. The storage subsystem includes a plurality of data storage devices accessible to host devices, a data storage medium storing a mailbox, and a computer able to read the mailbox. The mailbox stores control parameters that are rewritable by the host devices. The computer stores an executable program of instructions for a method of data swapping between storage volumes of the storage subsystem. The computer reads the control parameters to initialize the program.

In a third aspect, the invention provides a storage medium storing an executable program of instructions. The instructions cause a computer to perform the above-described method of balancing workloads of storage devices of a storage subsystem.

BRIEF DESCRIPTION OF THE DRAWINGS

Other objects, features, and advantages of the invention will be apparent from the following description taken together with the drawings in which:

FIG. 4A illustrates a table that the service processor of FIGS. 1A, 1B and 3 uses to store historical data on workloads;

FIG. 4B illustrates a file that stores priority data on storage volumes;

DESCRIPTION OF THE PREFERRED EMBODIMENTS

This application incorporates, by reference, in the entirety, co-pending U.S. application Ser. No. 09/396,253 "Load Balancing on Disk Array Storage Device", by Eitan Bachmat et al filed on Sept. 15, 1999, and co-pending U.S. application Ser. No. 09/396,218, "Method for the Transparent Exchange of Logical Volumes in a Disk Array", by Moshe Schreiber et al, filed on Sept. 15, 1999, which issued as U.S. Pat. No. 6,341,333 on Jan. 22, 2002.

As used in this application, the workload of a storage device is defined to be the amount of work that the device performs as a result of data access requests. One measure of the workload is a total number of accesses. Another measure uses a weighted sum of the numbers of each type of access, e.g., reads, writes, and prefetches. The measure thus can attach different weights to the various types of accesses.

Distributed Storage Subsystem

Figure 1A:
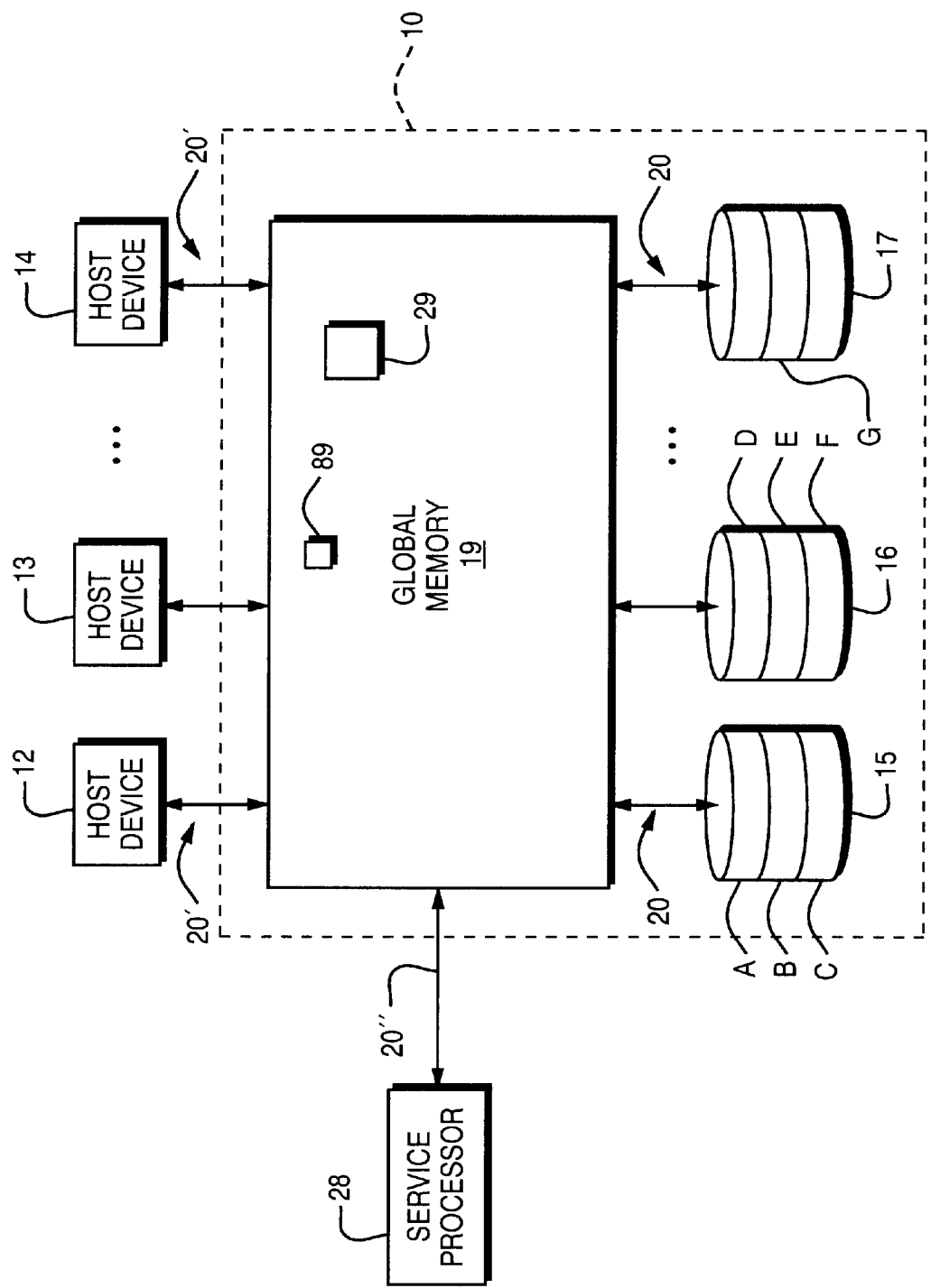
FIG. 1A is a block diagram of a storage subsystem providing shared data storage to a group of host devices.

FIG. 1A shows a storage subsystem 10 that provides shared data storage to a group of host devices 12–14. The shared data storage is located on physical storage devices 15–17, e.g., multiple disk devices, that are accessible to the host devices 12–14 through a global memory 19. The host devices 12–14 and storage devices 15–17 connect to the global memory 19 through channels 20= and 20, respectively, e.g., busses or networks.

Figure 1B:
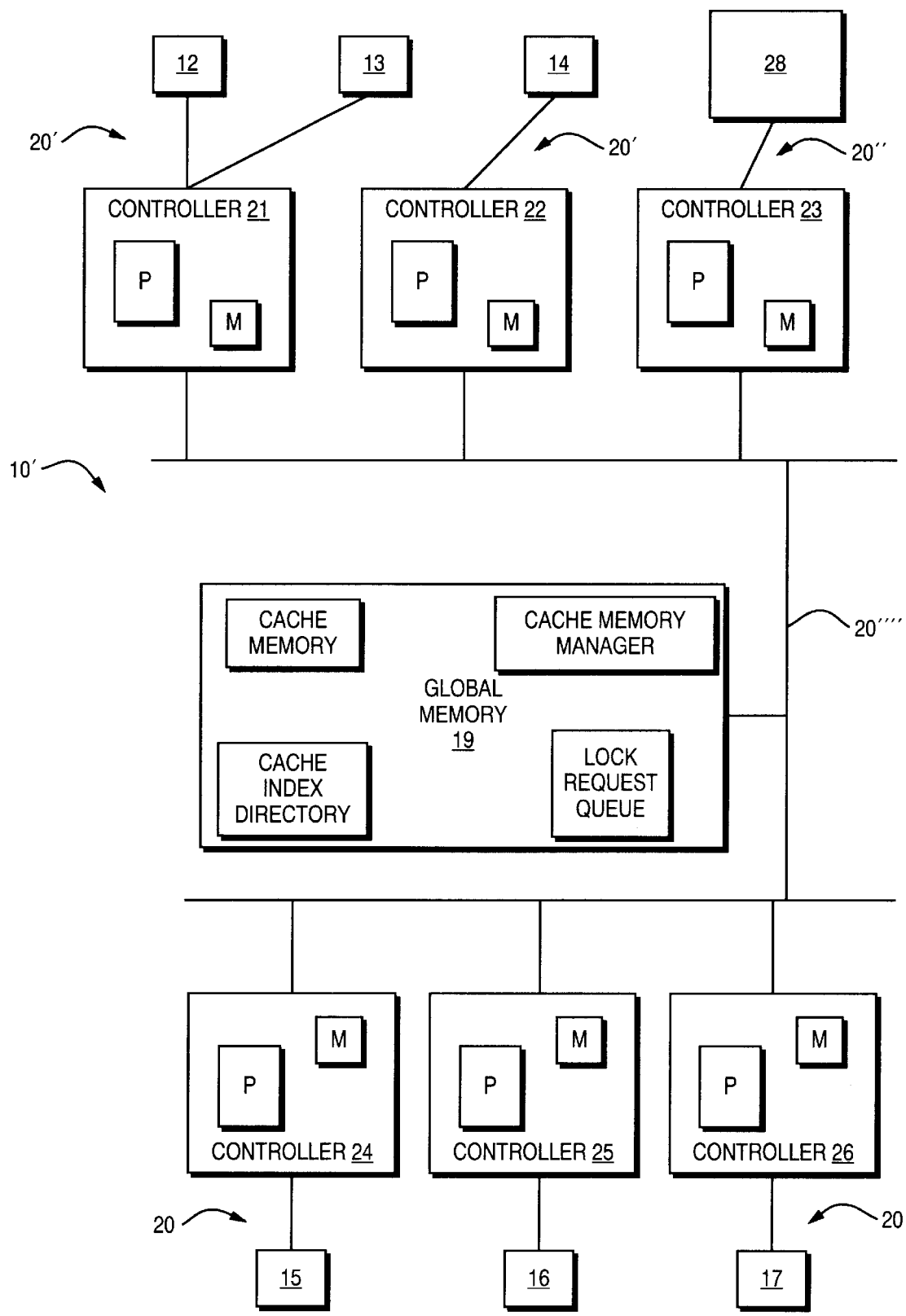
FIG. 1B is a diagram of one embodiment of the storage subsystem of FIG. 1A.

FIG. 1B shows an embodiment 10' of the storage subsystem 10 that uses several intelligent controllers 21–26. Each controller 21–26 manages communications between one or more devices 12–17 to the controller 21–26 and the remainder of the storage subsystem 10'. Each controller 21–26 includes a processor P and a local memory M. The local memory M stores executable software for communication protocols adapted to communicating with the particular devices 12–17 coupled to the controller 21–26.

The controllers 21–26 couple the devices 12–17 and service processor 28 to the global memory 19 via a collection of busses and/or a network 20"".

The global memory 18 is a staging area for communications and data transfers between the host and storage devices 12–17. The locally coupled controller 21–26, first transfers data from the source device 12–17 to a cache memory located in the global memory 19. Then, the data is transferred from the cache memory to the destination device 12–17. The cache memory includes a cache memory manager for managing cache accesses and a cache index directory for identifying data stored in the cache.

Since several host controllers 21–23 may request access the storage devices 12–14 simultaneously, the global memory 19 includes a lock. A requesting device 12–14 obtains the lock prior to accessing the storage devices 15–17 and relinquishes the lock after performing the desired accesses. Requests for the lock are stored in a lock request queue.

Referring again to FIG. 1A, the storage devices 15–17 physically divide into separate storage volumes, A–G. The storage volumes A–G may either be disk partitions identified by device, head, and cylinder identifiers or smaller regions of the physical storage devices 15–17. The distribution of data over the physical storage volumes A–G is at least partially hidden from the host devices 12–14, because the host devices 12–14 see the storage subsystem 10 as a collection of logical volumes. Since the host devices 12–14 do not see the underlying physical layout, the physical distribution of data in the storage subsystem 10 may be changed transparently to the host devices 12–14. One way of changing the distribution of data involves performing a series of swaps between pairs of the physical storage volumes A–G.

Figure 2:
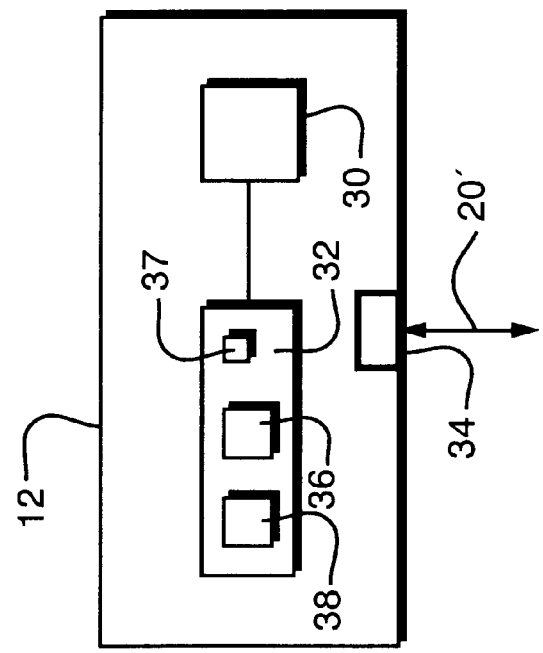
FIG. 2 is a block diagram of one of the host devices shown in FIGS. 1A–1B.

FIG. 2 is a block diagram of one of the host devices 12–14 shown in FIG. 1, i.e., host device 12. The host device 12 is a personal computer that has a microprocessor 30, a data storage device 32, such as a random access memory (RAM), and/or mass storage such as a magnetic or optical disk, and an I/O interface 34. The data storage device 32 stores application programs 36, 37 and a communication program 38 that can be executed by the microprocessor 30. The application programs 36, 37 communicate with the storage subsystem 10 through the communication program 38. The communication program 38 also generates a GUI that enables a user to control communications interactively.

Referring again to FIG. 1A, a service processor 28 couples to the global memory 19 through a bus 20" and the controller 23. The global memory 19 stores a mailbox 29 for the service processor 28 at a fixed and known address. The mailbox 29 can receive and store data from the host devices 12–14. Subsequently, the stored data can be read from the mailbox 29 by the service processor 28. The mailbox 29 provides file locations for direct communication between the host devices 12–14 and the service processor 28. The service processor 28 may read its mailbox 29 frequently, e.g., every minute.

Figure 3:
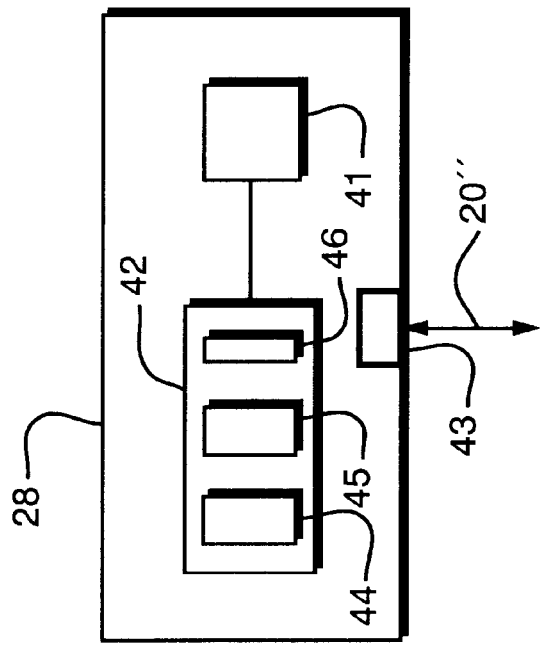
FIG. 3 is a block diagram of the service processor shown in FIGS. 1A–1B.

FIG. 3 is a block diagram illustrating the service processor 28 of FIG. 1. The service process is a programmed computer, e.g., a laptop, that has a microprocessor 41, a data storage device 42, e.g., a RAM, a hard drive, and/or a mass storage such as a magnetic or optical disk, and an interface 43. The data storage device 42 stores a software program 44 for balancing workloads, a communication program 45, and a table 46 for storing historical data describing the workloads. The programs 44, 45 are executable by the microprocessor 41. The program 44 for balancing workloads generates a GUI that enables interactive user control while balancing workloads of the storage devices 15–17. The program 44 communicates with the storage subsystem 10 through the communication program 45.

FIG. 4A illustrates the table 46 of FIG. 3, which stores historical data on the workloads of the storage volumes A–G. The table 46 is a matrix having columns 47 that identify individual storage volumes A–G and rows 48 that identify time slices over which the workload data has been collected. Each entry is a counter value indicating a total number of data accesses to the associated physical storage volume A–G. In some embodiments, the entries give separate counter values for the numbers of reads, writes and prefetches to the associated storage volume A–G.

Several properties of the table 46 are controlled by parameter values read from the service processor=s mailbox 29. One such parameter determines the total number N of rows 48 in the table 46, i.e., the maximum number of time slices of stored workload data. Other such parameters, of column 49 determine whether to exclude data from selected rows 48 of the table 46 from use in algorithms that select the data swaps used to better balance workloads of the storage devices 15–17.

Referring to FIG. 4B, other control parameters fix swap priorities for each individual storage volume A–G. The service processor 28 stores the values of the swap priorities in a file 50. The service processor 28 updates the swap priorities in the file 50 by reading new values of the priorities from the mailbox 29.

In one embodiment, the swap priority for a storage volume A–G can have one of three values, i.e., enabled, disabled, and preferred. The value disabled stops the service processor 28 from swapping data in the associated storage volume A–G. The enabled value allows the service processor 28 to swap data in the associated storage volume A–G. The preferred value makes the service processor 28 swap the associated storage volume A–G before swapping storage volumes having the enabled value as explained in more detail below. The preferred priority may be assigned to those storage volumes A–G requiring fast accesses.

Balancing Workloads

The service processor 28 balances workloads of the storage devices 15–17 based on historical data detailing the number of data accesses. The host devices 12–14 can adjust the balancing process. The host devices 12–14 can change values of control parameters for the process by writing new values to the service processor=s mailbox 29.

Figure 5A:
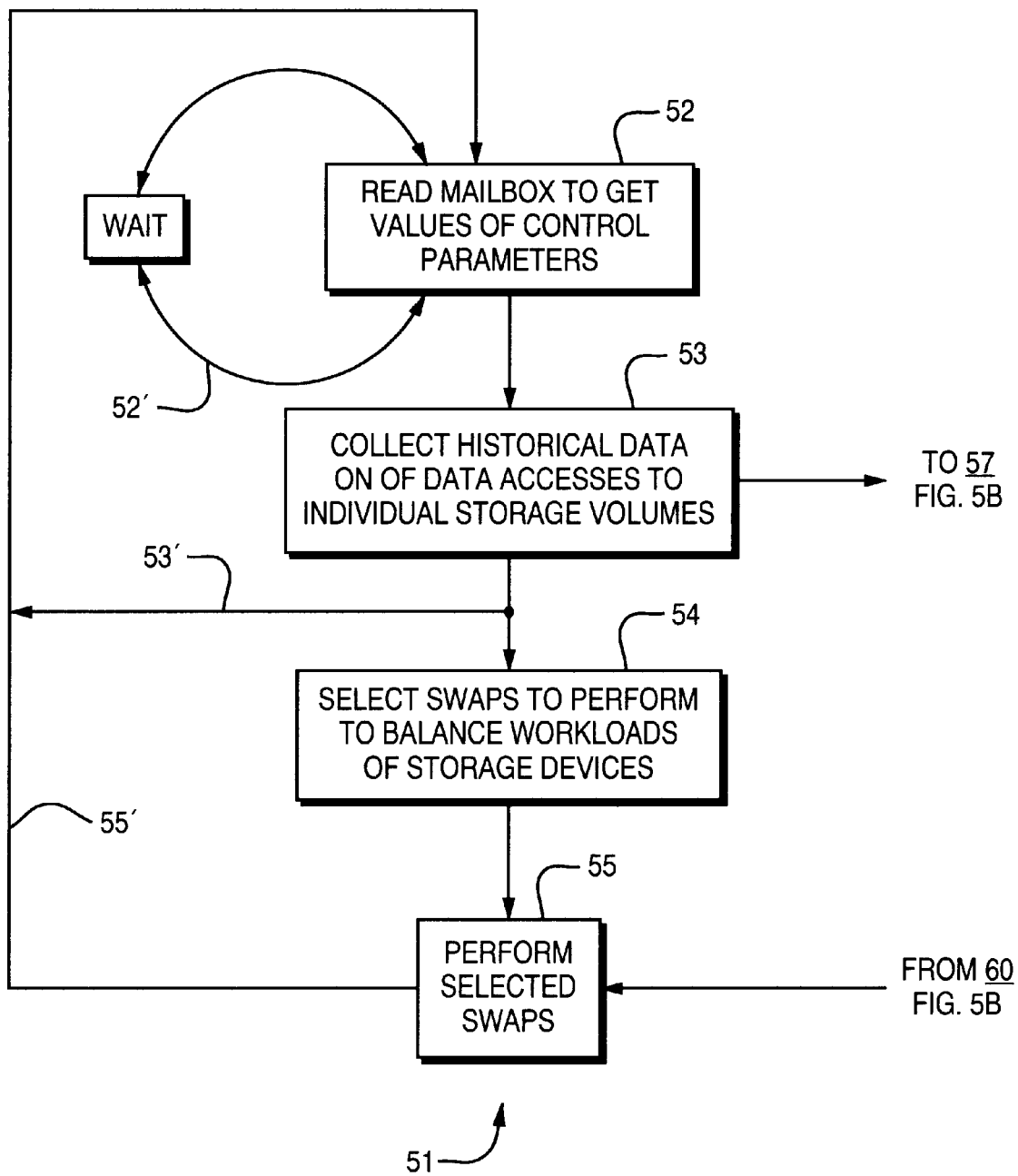
FIG. 5A is a flow chart illustrating a cyclic method of balancing workloads of the storage devices shown in FIGS. 1A–1B.

FIG. 5A is a flow chart illustrating a cyclic method 51 used by the service processor 28 to better balance workloads of the storage devices 15–17. To start a new balancing cycle, the service processor 28 reads its mailbox 29 to get new values, if any, of parameters that control the balancing process (step 52). Then, the service processor 28 collects samples of historical data (step 53). The samples describe the number of data accesses to each physical storage volume A–G of the storage subsystem 10 during a time slice. The collected historical data is stored in the internal table 46 shown in FIG. 3.

After collecting each sample, the service processor 28 loop back (53') to step 52 to start the collection cycle for the next sequential time slice by rereading the mailbox 29. The loop back frequency is controlled by a control parameter obtained from the mailbox 29. The default frequency is once every fifteen minutes.

After collecting a predetermined number of samples, the service processor 28 selects data swaps that will lead to better-balanced workloads for the storage devices 15–17 (step 54). The predetermined number of samples is fixed by another control parameter from the mailbox 29.

The swap selections are based on predictions that assume that future workloads will track trends described by the historical data. One algorithm selects data swaps that would have produce more balanced workloads when averaged over the period of the historical workload data provided that the swaps had been performed earlier.

The selected data swaps are performed to implement balancing (step 55). After performing the swaps, the service processor 28 performs loop 55' to restart the balancing process.

The service processor 28 regularly rereads the mailbox 29. After each read, the service processor performs loop 52' waiting a preselected time and then rereading the mailbox 29. Parameters from each read are used to re-initialize control parameters stored in the service processor 28 for controlling workload balancing. The frequent rereads of the mailbox 29 keep the method 51 updated with respect to changes in the control parameters.

As an example of the timing of loops 52', 53', and 55', the service processor 28 may perform loop 52' every minute, perform loop 53' every fifteen minutes, and perform loop 55' every day. But, the length of each loop 52', 53', 55' can differ substantially.

Figure 5B:
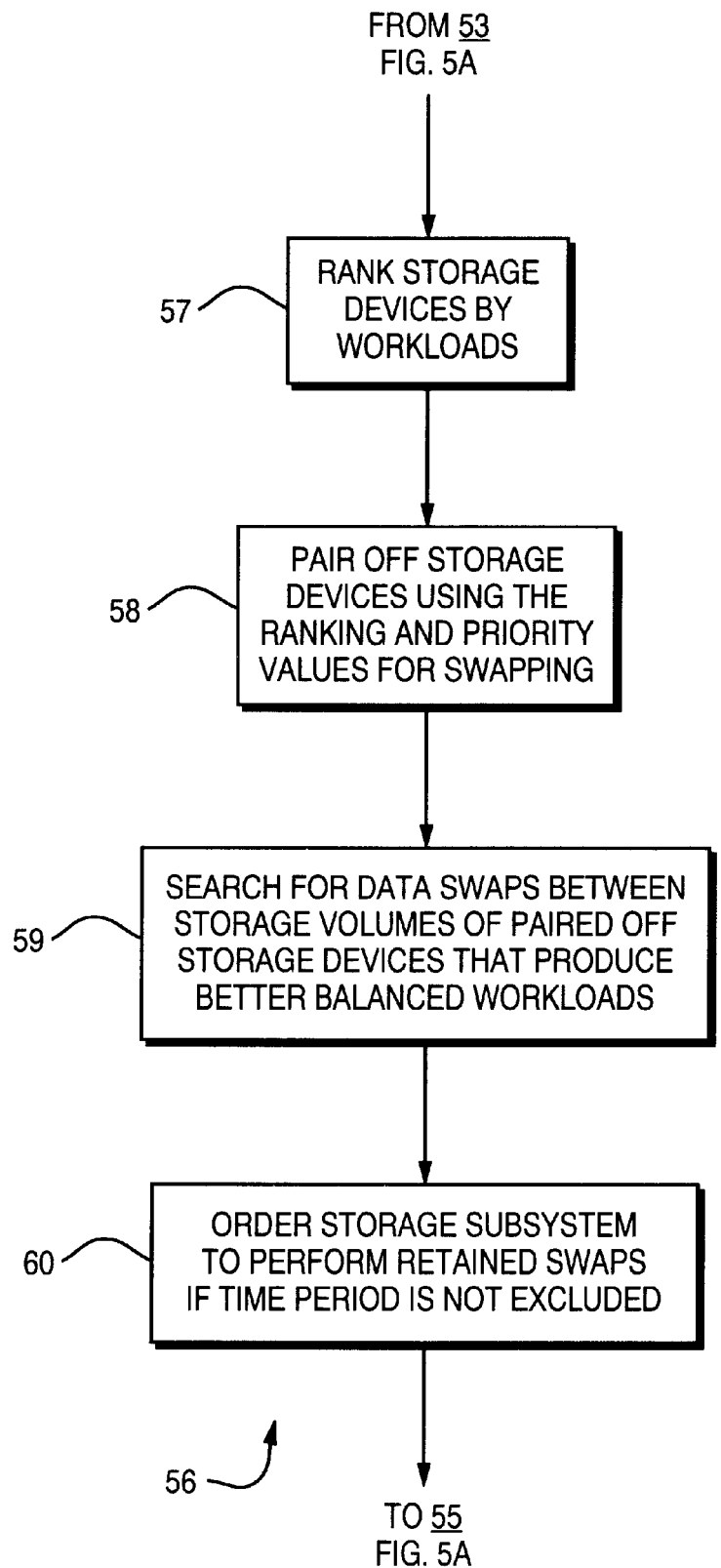
FIG. 5B is a flow chart illustrating a method of selecting data swaps that better balance workloads.

FIG. 5B is a more detailed flow chart for a method 56 of selecting the data swaps that balance workloads as described in step 54 of FIG. 5A. To start the selection of data swaps, the service processor 28 ranks the storage devices 15–17 according to workloads (step 57). The ranking is based on the non-excluded historical data from the table 46. After performing the ranking, the service processor 28 pairs off the storage devices 15–17 (step 58). The storage devices 15–17 having the heaviest workloads are paired off with the storage devices 15–17 with the lightest workloads.

For each identified pair of storage devices 15–17, the service processor 28 searches for swaps of physical storage volumes A–G that produce better balanced workloads (step 59). A swap must reduce historical imbalances of workloads for the paired storage devices 15–17 by more than predetermined threshold amount, e.g., ten percent, to be retained. Two storage volumes A–G must have the same size and emulation characteristics to qualify as potentially swappable. The service processor 28 then orders the storage subsystem 10 to perform the retained swaps (step 60). The retained swaps are performed, at step 60, provided that the swaps are not time excluded by control parameters and data availability will not be compromised.

The service processor 28 makes a check to determine whether performing the swap will impact data availability. Availability is less affected if the storage subsystem 10 has multiple copies of the data to be swapped. If multiple copies exist, the swap of a storage volume A–G holding one copy does not reduce the overall availability of the data. If swapping compromises data availability, the swap is not performed at step 60.

To implement priorities stored in file 50, shown in FIG. 4B, the service processor 28 searches for swaps of storage volumes A–G in two stages for each pair of storage devices 15–17. First, the service processor 28 searches for swaps of storage volumes A–G of a pair of devices 15–17 in which at least one volume A–G of the pair has the "preferred" priority value. Second, the service processor 28 searches for additional swaps between the remaining storage volumes AG that will further balance the pair. The additional swaps are between storage volumes A–G having the "enabled" priority value.

Referring again to FIG. 4A, the data of the table 46 will be used to illustrate one algorithm for selecting data swaps in steps 57–59 of FIG. 5B.

At step 57, the service processor 28 uses an algorithm that ranks the storage devices 15–17 based on average workload per non-excluded time slice. Non-excluded time slices correspond to rows 1–3 of exemplary table 46 as is seen from the column 49. During the non-excluded time slices, table 46 shows that the storage devices 15 and 16 had 66 and 36 accesses, respectively. During the same period, the storage device 17 had 54 accesses (not shown in FIG. 4A). From the numbers of accesses, the average workloads of the storage devices 15, 16, and 17 are 22, 12, and 18 accesses per time slice, respectively. Thus, the service processor 28 will rank the respective storage devices 15, 16, and 17 as most busy, least busy, and second most busy, respectively.

At step 58, the service processor 28 pairs off the most and least busy of the storage devices 15–17. Thus, the service processor 28 pairs storage devices 15 and 16 and determines that the storage device 17 will not participate in data swaps.

At step 59, the service processor 28 uses a search algorithm to select data swaps that decrease workload imbalances by more than a threshold amount. Since the imbalance between the storage devices 15 and 16 is ten accesses per time slice, only data swap that reduce the imbalance by at least 2.5 accesses per time slice can be selected if the threshold is 25%. Swapping the data of storage volume A with storage volume D or E will reduce the imbalance between storage devices 15 and 16 by 1.33 and 2 accesses per time slice, respectively. Both reductions are too small for the service processor 28 to select these data swaps. Swapping storage volumes A and E will reduce the imbalance between the storage devices 15 and 16 by 4.66 accesses per time slice, which is greater than the exemplary threshold of twenty-five percent. Thus, the service processor 28 will select the data swap between volume A and volume E at step 59.

After selecting the data swap between storage volumes A and E, the service process 28 searches for other data swaps between the remaining storage volumes B, C and D, F. Any further selections of data swaps must further decrease the workload imbalance between the storage devices 15 and 16 by an above threshold amount. Swapping the storage volumes A and E makes the workload of the storage device 15 less than the workload of the storage device 16. Any data swaps between the storage volumes B, C and the storage volumes D, F will increase the imbalance between the storage devices 15 and 16. Thus, the method 56 will only select to swap the storage volumes A and E for the workloads shown in FIG. 4A.

Other algorithms exist for determining which data swaps better balance workloads at step 59. Co-pending U.S. application Ser. No. 09/396,275, "Maximizing Sequential Output in a Disk Array Storage Device", by Eitan Bachmat et al, filed Sep. 15, 1999, and co-pending U.S. application Ser. No. 09/396,217, "Method for Analyzing Disk Seek Times in a Disk Array Storage Device" by Tao Kai Lam et al, filed Sep. 15, 1999 disclose such algorithms and are incorporated by reference, in their entirety, in the present application.

Figure 6A:
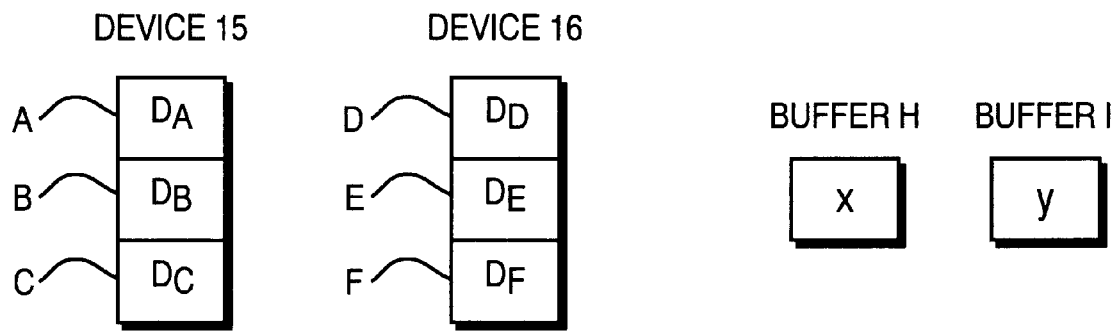
FIGS. 6A–6C are a time sequence illustrating a data swap between a pair of storage devices shown in FIGS. 1A–1B.
Figure 6B:
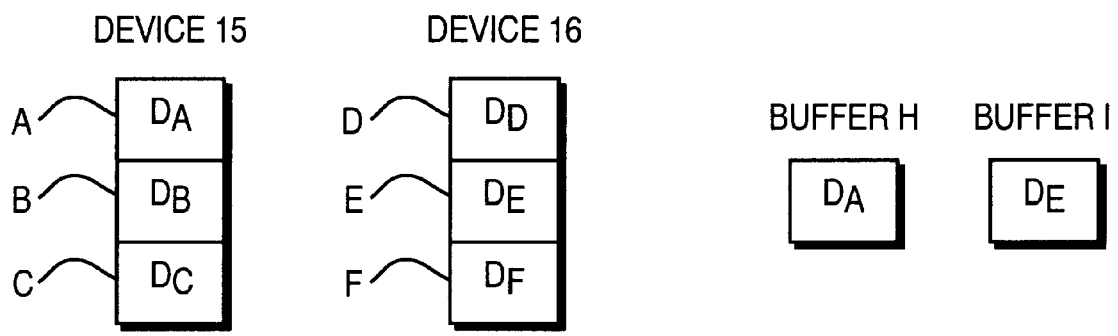
Figure 6C:
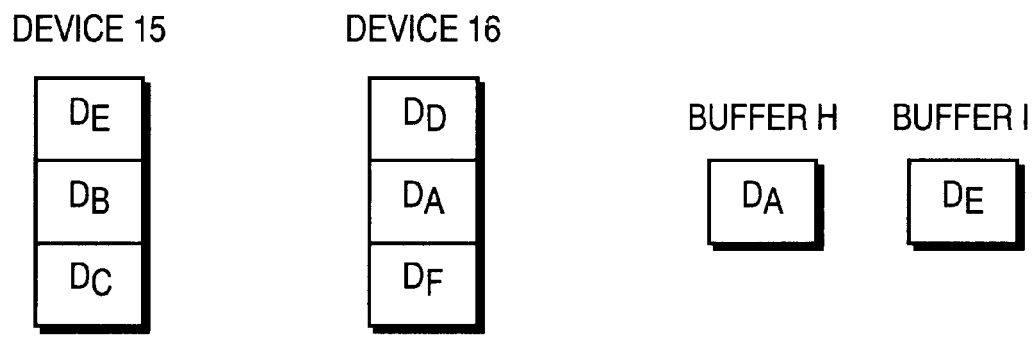

FIGS. 6A–6C illustrate a time sequence for making the above-selected data swap between storage volumes A and E of the storage devices 15 and 16. To swap data, the pair of physical storage volumes A and E should have the same size and store data in the same emulation, e.g., fixed-block versus count-key-data. The swap uses a pair of buffer storage regions H and I, which are large enough to store the data from the storage volumes A and E, respectively.

FIG. 6A shows the storage devices 15, 16 and buffers H, I prior to the swap. Storage volumes A–C and D–F contain data $D_A$–$D_C$ and $D_D$–$D_F$, respectively. The buffers H, I initially store old or nonsense data X, Y.

FIG. 6B shows the storage devices 15, 16 and buffers H, I after a parallel write of the data $D_A$ and $D_E$ from the storage volumes A, E to the buffers H, I. Now, the buffers H, I store the data $D_A$ and $D_E$ being swapped.

FIG. 6C shows the storage devices 15, 16 and buffers H, I after parallel writes of the data $D_A$ from buffer H and the data $D_E$ from buffer I back to the storage volumes E and A, respectively. The write back sends the data $D_A$ originally in the storage volume A to the storage volume E and the data $D_E$ originally in the storage volume E to the storage volume A completing the swap.

The service processor 28 also changes mapping information relating the physical storage volumes A, E, which store the data $D_A$, $D_E$ to logical identifiers. After changing the mapping information, the logical identifiers for $D_A$ point to the storage volume E and the logical identifiers for $D_E$ point to the storage volume A.

Figure 7:
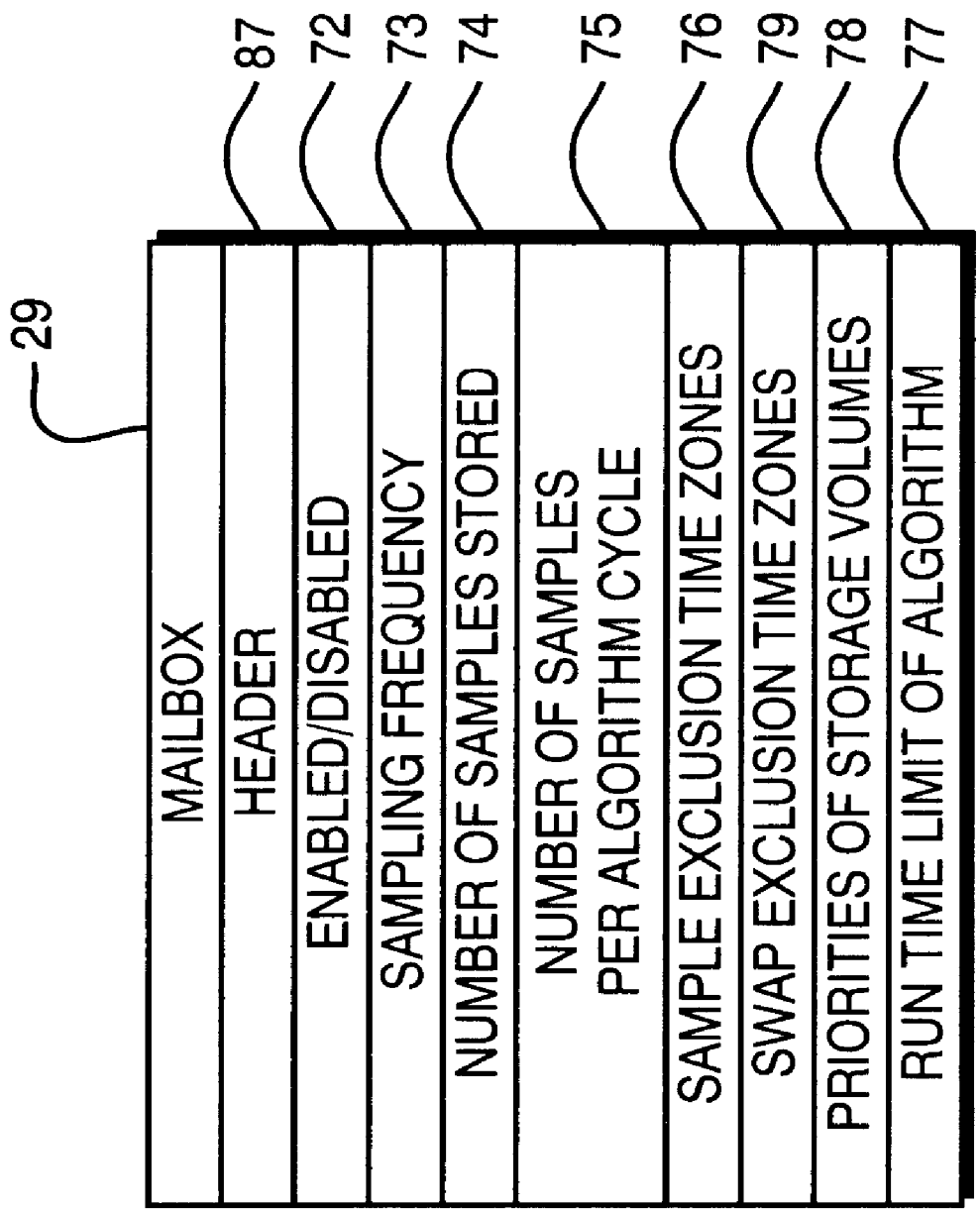
FIG. 7 illustrates the mailbox assigned to the service processor shown in FIGS. 1A–1B.

FIG. 7 illustrates the form of the mailbox 29 assigned to the service processor 28 of FIG. 1. The mailbox 29 stores control parameters 72–79 whose validity or invalidity is indicated in a header 87 area. The control parameters 72–79 can be overwritten by the host devices 15–17 to change details of the method 51, 56 of FIGS. 5A–5B.

One parameter 72 of the mailbox 29 acts like a switch for turning the method 50 on and off.

The parameters 73–74 control the collection of data on workloads, shown in step 53 of FIG. 5A. The parameter 73 defines the frequency at which the service processor 28 samples for new data on workloads of the storage volumes A–G. The parameter 74 defines the maximum number of time slices of workload data that the service processor 28 stores in the table 46 of FIG. 4A.

The parameters 75–77 control the method for selecting which storage volumes A–G to swap at steps 54 of FIG. 5A. The parameter 75 defines the number of time slices of workload data collected between selections of storage volumes A–G to swap. The parameter 76 indicates time slices of collected historical data that should be ignored when ranking the storage devices 15–17 and searching for swaps at steps 54 and 59 of FIGS. 5A and 5B. The parameter 76 enables users to determine which workload data is used during swap selection. For example, a user may exclude weekends that are unlikely to be indicative of actual workloads on weekdays. The parameter 77 limits the run time for selecting storage volumes to swap. The run time limit enables users to cut off long determinations, which occur when swaps would only produce small improvements to load balancing.

Finally, the parameter 79 defines an exclusion time zone in which performing selected swaps is forbidden. The exclusion time zone does not affect the collection of historical data at step 53 of FIG. 5A.

The parameters 78 assign a value for a swapping priority to each physical storage volume A–G. The three values of the priority are disabled, enabled, and preferred. A storage volume A–G with the "disabled" value cannot be swapped. Storage volumes A–G with either the "enabled" or the "preferred" values can be swapped. A storage volume A–G with the "preferred" value swaps preferentially over a storage volume A–G with the "enabled" value as was explained above in more detail.

Figure 8:
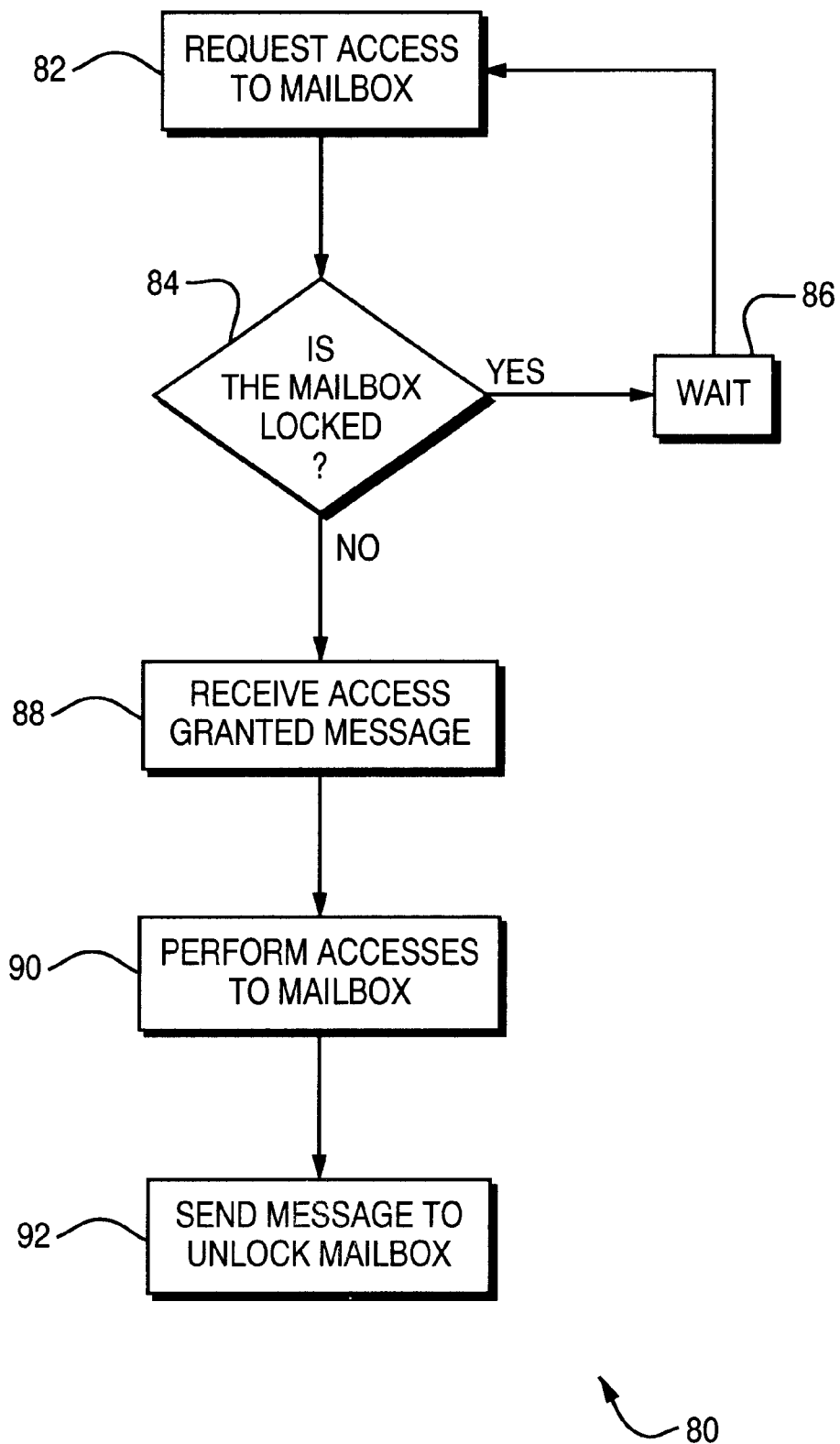
FIG. 8 is a flow chart illustrating a method of accessing the mailbox of the service processor.

FIG. 8 illustrates a method 80 by which a device, e.g., host devices 12–14 and service processor 28, accesses the service processor's mailbox 29. The device sends a message to the controller 18 requesting the right to access the mailbox 29 (step 82). If the mailbox 29 is locked, the device receives an "access denied" message from the controller (step 84). The device waits a preselected time to enable other devices to release the lock on the mailbox 29 before again requesting access (step 86).

Referring again to FIG. 7, the mailbox 29 is locked while any device has a right to access. The locked status is indicated by a flag entry stored at a known storage location 85 of the memory 19 of FIG. 1. Only one device has the right of access to the mailbox 29 at one time so that consistency of the control parameters therein is assured. To release the locked status, the device granted the right of access must take an affirmative action.

Referring again to FIG. 8, the device receives an "access granted" message from the controller 18 if the mailbox 29 is not locked (step 88). After being granted access, the device accesses the mailbox 29 to read and/or write control parameters as desired (step 90). After as completing the desired accesses, the device sends a message to the controller 18 to terminate its right of access to the mailbox 29, i.e., to unlock the mailbox 28 (step 92).

After being unlocked, other host devices 12–14 can access the mailbox 29. If new values of the control parameters are written to the mailbox 29, the new values affect the balancing of workloads after the service processor 28 again reads the mailbox 29.

Figure 9:
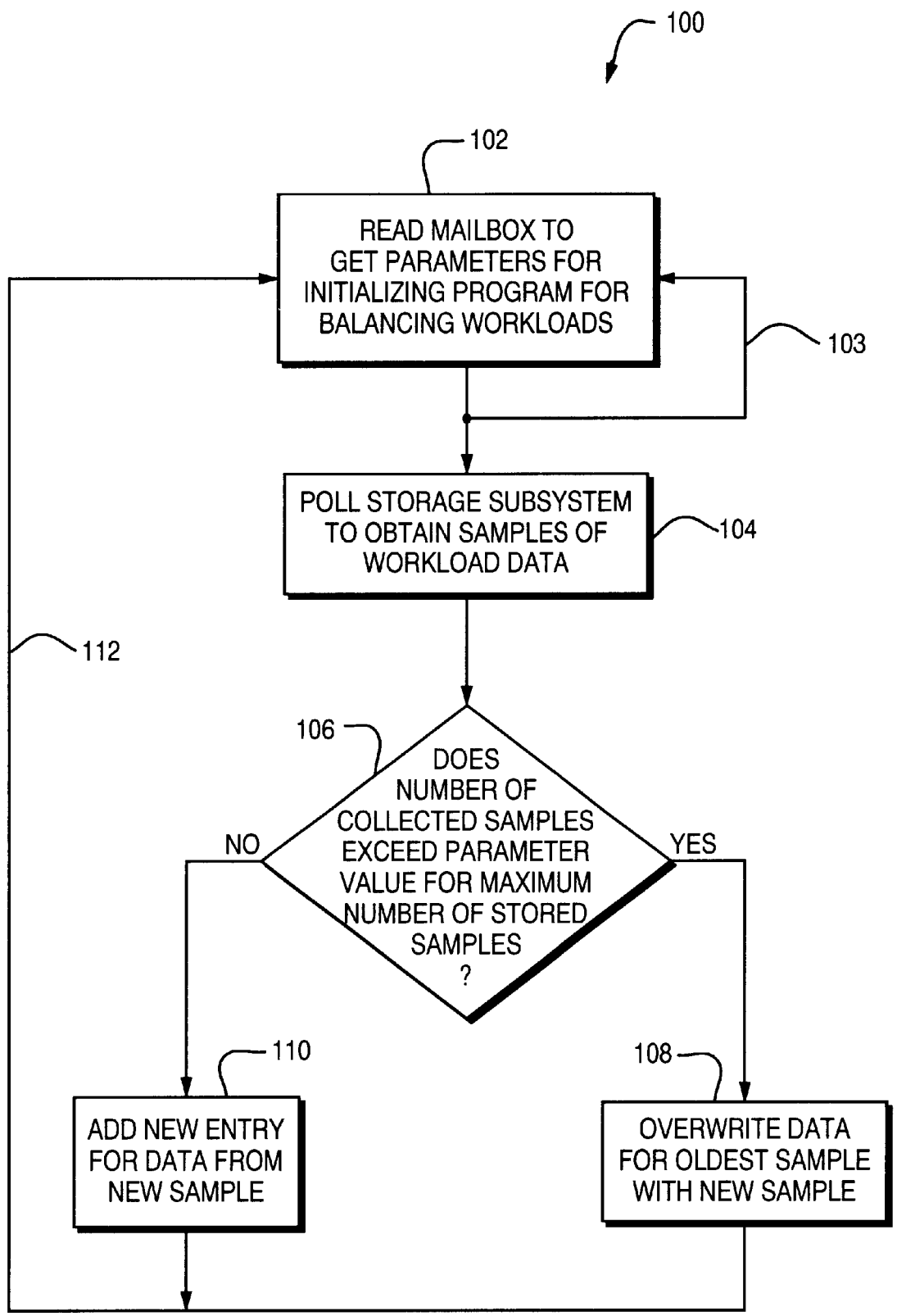
FIG. 9 is a flow chart illustrating a method of collecting historical data.

FIG. 9 is a flow chart illustrating one method 100 of collecting historical data on workloads at step 53 of FIG. 5A. The service processor 28 reads the mailbox 29 according to the method 80 of FIG. 8 to get parameters for initializing the program 44 for balancing workloads (step 102). The service processor 28 rereads the mail box regularly, e.g., once per minute (loop 103). After getting initial values of the control parameters, the service processor 28 polls the storage subsystem 10 to obtain a sample of workload data for each physical storage volume A–G (step 104). Next, the service processor 28 checks whether the number of collected samples exceeds the value of the parameter 74, shown in FIG. 7, for the number of samples to store (step 106). The control parameter 74 fixes the maximum number of time slices for which samples are stored in the table of historical data on workloads 46, shown in FIG. 4A. If the number of time slices for collected samples exceeds the value of the parameter 74, the service processor 28 overwrites the sample in the table 46 for the oldest time slice with the new sample (step 108). Otherwise, the service processor 28 writes a new entry for the new sample in the table 46 (step 110).

After writing the new workload data in the table 46, the service processor 28 returns step 104 to reread the mailbox starting a new sampling cycle (loop 112). The service processor 28 polls for samples of workload data with a sampling frequency fixed by a control parameter read from the mailbox 29 at step 102. After a predetermined number of samples have been collected, the service processor 28 selects and performs swaps to better balance workloads, i.e., steps 54–55 of FIG. 5A.

Other additions, subtractions, and modifications of the described embodiments may be apparent to one of ordinary skill in the art.

What is claimed is:

1. A method of balancing workloads of storage devices of a storage subsystem, comprising:

reading a mailbox to obtain control parameters written therein and rewritable by one or more host devices;

collecting historical data on numbers of accesses to a plurality of storage volumes of the storage devices, and updating a table having entries for numbers of accesses to physical storage volumes during a set of time slices; and selecting one or more data swaps that lead to better balanced workloads of storage devices based on the historical data, one of the act of selecting and the act of collecting being defined by the control parameters, wherein the control parameters determine one of a maximum number of time slices represented in the table and a frequency of collecting historical data for new time slices.

2. The method of claim 1, wherein the control parameters include one of exclusion time zones for data swaps and exclusion zones for the time slices of historical data used to select data swaps.

3. A storage subsystem for providing data storage to a plurality of host devices, comprising:

a plurality of data storage devices accessible to host devices;

a data storage medium storing a mailbox, the mailbox storing control parameters rewritable by the host devices; and a computer coupled to read the mailbox and storing an executable program of instructions for a method of data swapping between storage volumes of the storage subsystem, the computer reading the control parameters for initializing the program from the mailbox, wherein the program includes instructions for a method of collecting data on numbers of accesses to storage volumes of the storage devices during a sequence of time slices. and wherein the control parameters initialize the method of collecting data.

4. The storage subsystem of claim 3, wherein the control parameters initialize one of a frequency for collecting data and a number of time slices of collected data to store.

5. The storage subsystem of claim 3, wherein the program comprises:

instructions for selecting data swaps between storage devices that better balance workloads based on the collected data; and the control parameters include a schedule for performing new selections of the data swaps to rebalance workloads.

6. The storage subsystem of claim 5, wherein the schedule includes a number of time slices of new data on workloads to collect prior to performing one of the new selections of data swaps.

7. The storage subsystem of claim 6, wherein the schedule identifies a portion of the time slices of collected data to ignore when selecting data swaps that better balance workloads.

8. The storage subsystem of claim 5, wherein the schedule fixes a time limit for selecting the data swaps.

9. The storage subsystem of claim 3, wherein the program further comprises instructions for performing the selected swaps; and wherein the control parameters include an excluded time period for performing swaps.

10. A storage medium storing an executable program of instructions for balancing workloads of storage devices of a storage subsystem, the instructions to cause a computer to:

read a mailbox to obtain control parameters written therein and rewritable by one or more host devices;

collect historical data on numbers of accesses to a plurality of storage volumes of the storage devices, causing the computer to update a table with entries for numbers of accesses to physical storage volumes during a set of time slices, wherein the control parameters determine one of the maximum number of time slices represented in the table and a frequency of collecting the historical data for a new time slice; and select one or more data swaps that lead to better balanced workloads of storage devices based on the historical data, one of the instructions to cause the computer to collect historical data and select one or more data swaps being initialized by the control parameters.

11. The storage medium of claim 10, wherein the control parameters include at least one of an exclusion time zone for data swaps and an exclusion zone for the time slices of historical data available for selecting data swaps.

* * * * *